UNITED STATES PATENT OFFICE.

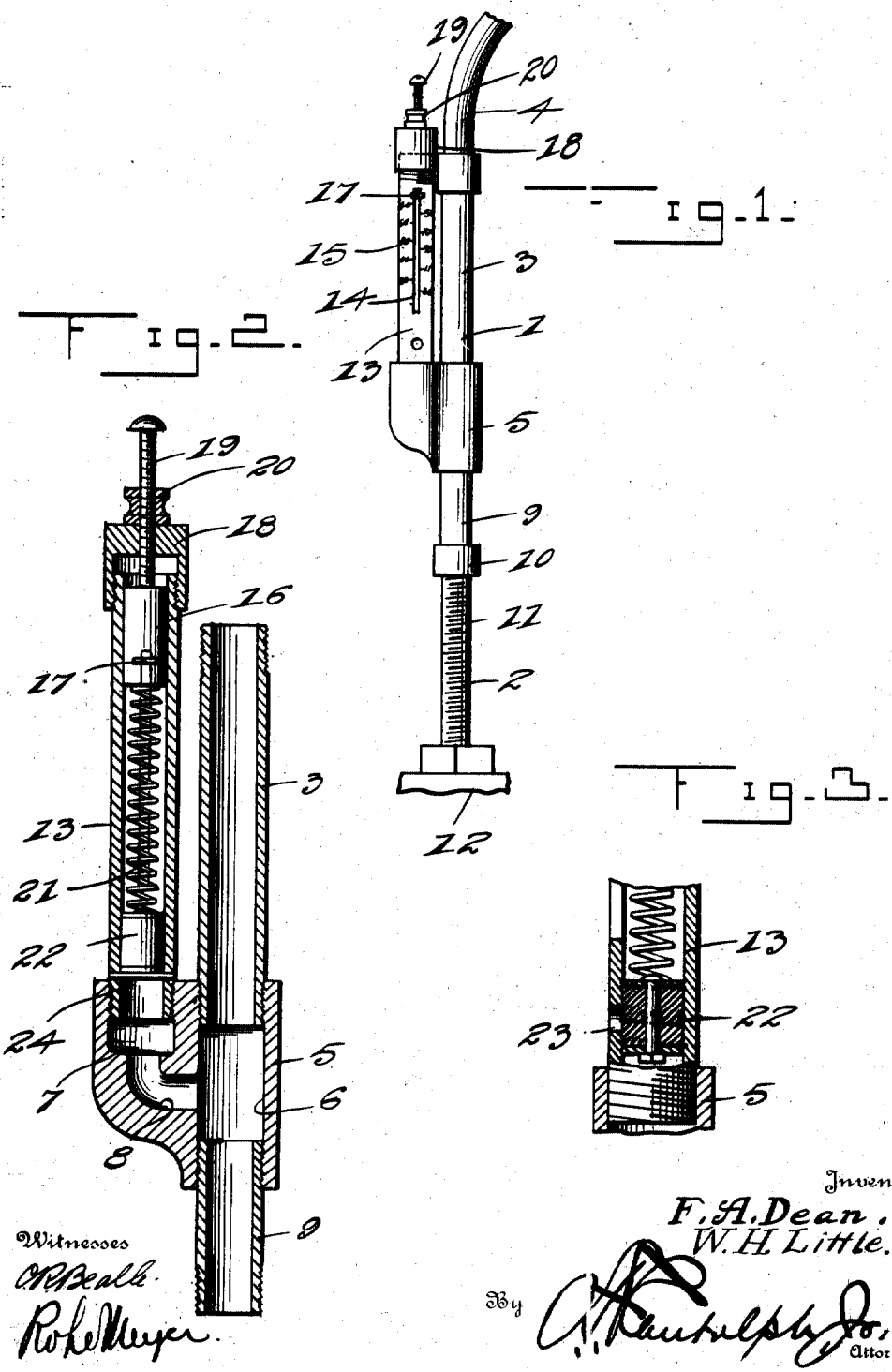

FRANKLIN A. DEAN AND WILLIAM H. LITTLE, OF ALTA VISTA, KANSAS.

AUTOMATIC VALVE FOR INFLATING TIRES.

1,219,925.          Specification of Letters Patent.          Patented Mar. 20, 1917.

Application filed November 30, 1914. Serial No. 874,819.

*To all whom it may concern:*

Be it known that we, FRANKLIN A. DEAN and WILLIAM H. LITTLE, citizens of the United States, residing at Alta Vista, in the county of Wabaunsee and State of Kansas, have invented certain new and useful Improvements in Automatic Valves for Inflating Tires; and we do hereby declare the following to be a full, clear, and exact description of the invention, such as will enable others skilled in the art to which it appertains to make and use the same.

This invention relates to a device for automatically controlling the inflation of inflatable bodies, and the primary object of the invention is to provide a device, controlled by the pressure of air in the inflatable body, which will act automatically for cutting off the ingoing air and also to maintain any predetermined pressure within the inflatable body.

Another object of this invention is to provide a device of this nature which is applicable for attachment to the ordinary inflating valve of the inner inflatable tube of pneumatic tires, and also attachable to the tube which leads from any suitable type of air supply source, and to associate in this device, a pressure gage which may be set at any predetermined quantity of pressure for regulating the pressure within the inflatable body.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a side elevation of the improved tire filler showing the same attached to the inflating valve of a pneumatic body.

Fig. 2 is a central sectional view through the improved automatic valve, and

Fig. 3 is a fragmentary vertical section through a part of the device.

Referring more particularly to the drawings, 1 designates the automatic valve or gage as an entirety, which is shown in Fig. 1 as attached to an ordinary type of inflating valve 2 used for the inflation of inflatable bodies and particularly the inner inflatable tubes of pneumatic tires.

The automatic valve or gage 1 includes a tube 3 which is adaptable for connection to the tube or hose 4 which is connected to any suitable type of compressed air supply, or to an ordinary type of pump for inflating the inflatable bodies. The tube 3 has its lower end detachably seated in the union 5 which union has a pair of parallel extending bores 6 and 7, which are connected to each other by a transversely extending passage 8. The transversely extending passage 8 is positioned substantially equi-distant of the ends of the bore 6, and is of less diameter than either the bore 6 or the bore 7.

The bore 6 has a tube 9 detachably mounted in its lower end and in alinement with the tube 3, which tube has a cap 10 mounted upon its lower end for air tight connection with the stem 11 of the valve construction 2 so as to form a continuous passage from the tube 4 through the tube 3, the bore 6 and the union 5, the tube 9 and through the valve mechanism 2 into the inflatable body indicated at 12 in Fig. 1 of the drawings.

The bore 7 which is positioned alongside of and parallel to the bore 6 has the lower end of a tube 13 detachably mounted therein.

The tube 13 forms the outer casing of a gage structure and it has a slot 14 formed longitudinally therein alongside of which slots are arranged graduations 15 designating various degrees of pressure of air. A plug 16 is slidably mounted in the upper end of the tube 13 and it has an indicating finger 17 formed thereupon which projects through the slot 14 and coacts with the graduations 15. A cap 18 is detachably mounted upon the upper end of the tube 13, which cap has a pin or bolt 19 extending therethrough. The bolt 19 extends through the cap 18 and engages the upper end of the plug 16, so that upon adjustment of the bolt, the plug 16 may be forced downwardly within the sleeve 13, for positioning the indicator 17 at various pressure degrees indicated by the graduations 15. A collar 20 is mounted upon the upper surface of the cap 18 and the bolt or screw threaded pin 19 is adjustably mounted in this collar.

A spiral spring 21 is mounted within the bore of the tube 13 and the upper end of the same engages the plug 16, while the lower end of the spring engages a piston 22, which is slidably seated in the tube 13. The tension of the spring 21 holds the piston 22 positioned within the tube 13 for forming a closure for the opening 23 which extends transversely through the wall of the sleeve and provides an overflow outlet for the air when the inflatable body has been properly inflated as indicated by the adjustment of the indicator 17. A pin 24 extends transversely through the tube 13 and provides means for limiting the downward movement of the piston 22.

In the operation of the improved valve or gage for inflating inflatable or pneumatic bodies, the sleeve 3 is connected to the tube of any suitable air suppply source and the tube 9 is connected to the valve stem of an ordinary type of inflating valve such as is carried by inflatable bodies and the plug 16 is forced downwardly against the tension of the spring 21 by the adjustment of the pin or bolt 19, until the indicating finger 17 designates degree of pressure which it is desired to inflate the inflatable body. After the device has been properly arranged, the air is permitted to enter the inflatable body, and when the pressure indicated by the indicating hand 17 is reached, it will overcome the tension of the spring 21, and force the piston 22 upwardly within the sleeve 13, causing the piston to move out of a closing position for the outlet opening 23, and thus permitting the surplus air to escape through the opening 23, and prevent excess inflation of the inflatable body.

From the foregoing description taken in connection with the accompanying drawings the advantages of construction and of the method of operation of the improved automatic valve for inflating tires will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:

A device for regulating the pressure in pneumatic bodies comprising a union having a pair of vertically extending parallel bores therein and a transversely extending bore connecting said parallel bores, a pipe connected to one of the parallel bores and adapted to be arranged in communication with an air supply, a second pipe connected to the other end of the mentioned bore and adapted to be communicated with an insulating valve, a gage structure operatively connected to the other of said parallel bores and including a vertical tube having an escape opening adjacent its lower end and a centrally located longitudinally extending slot in the wall thereof, the upper end of the vertical tube being disposed above the upper end of the first-mentioned pipe, a piston located within the tube and disposed below the slot and operable across the opening, a plug slidably mounted within the tube, an indicator carried by the plug and extending through the longitudinal slot in the tube, a spring interposed between the plug and the piston for returning the piston to normal position after the same has been operated, and means adjustable through the upper end of the tube and against the plug and adapted when moved in one direction to move the plug inwardly and against the tension of the spring, for the purpose specified.

In testimony whereof we affix our signatures in presence of two witnesses.

FRANKLIN A. DEAN.
WILLIAM H. LITTLE.

Witnesses:
 A. H. MESEKE,
 W. C. A. MESEKE.